UNITED STATES PATENT OFFICE.

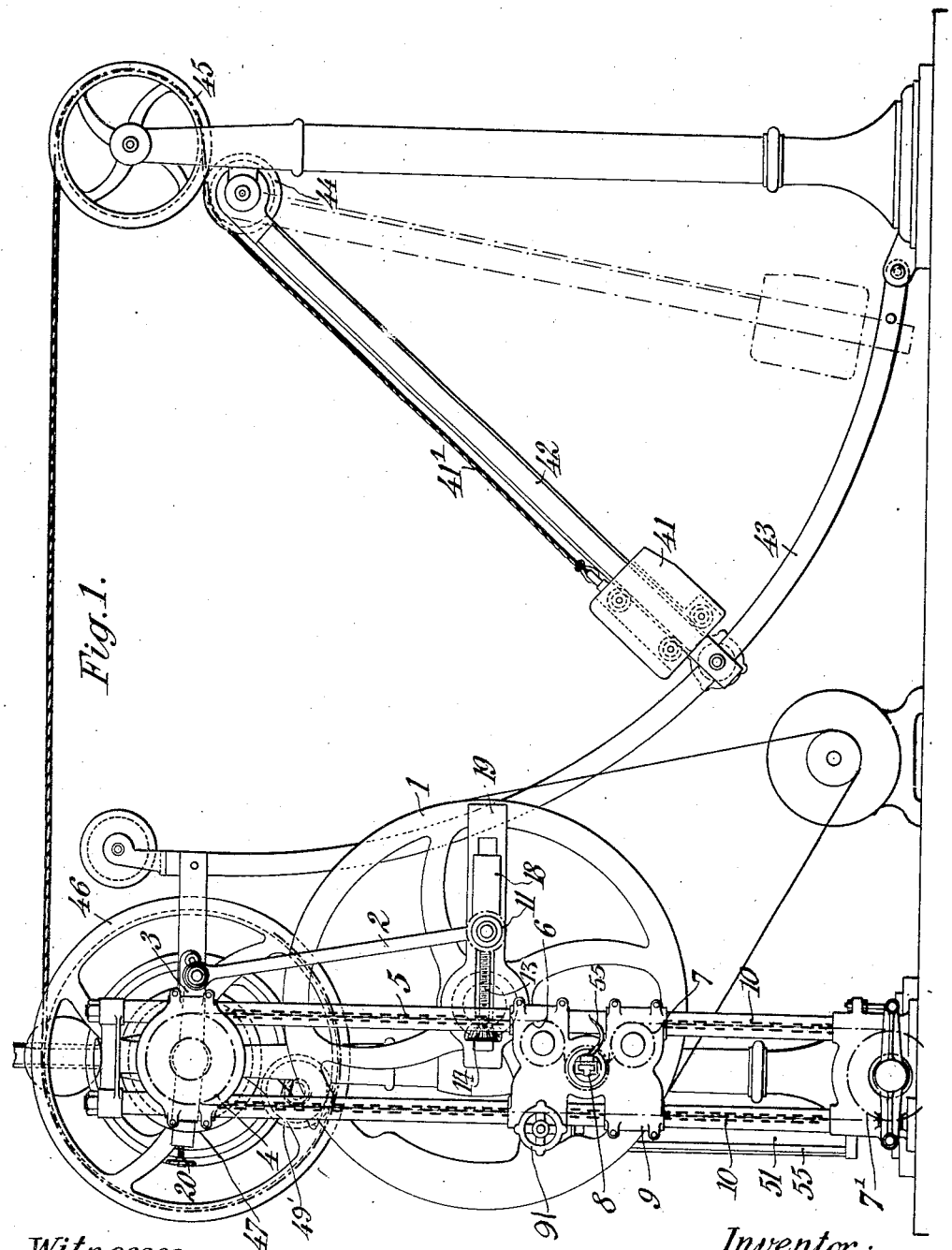

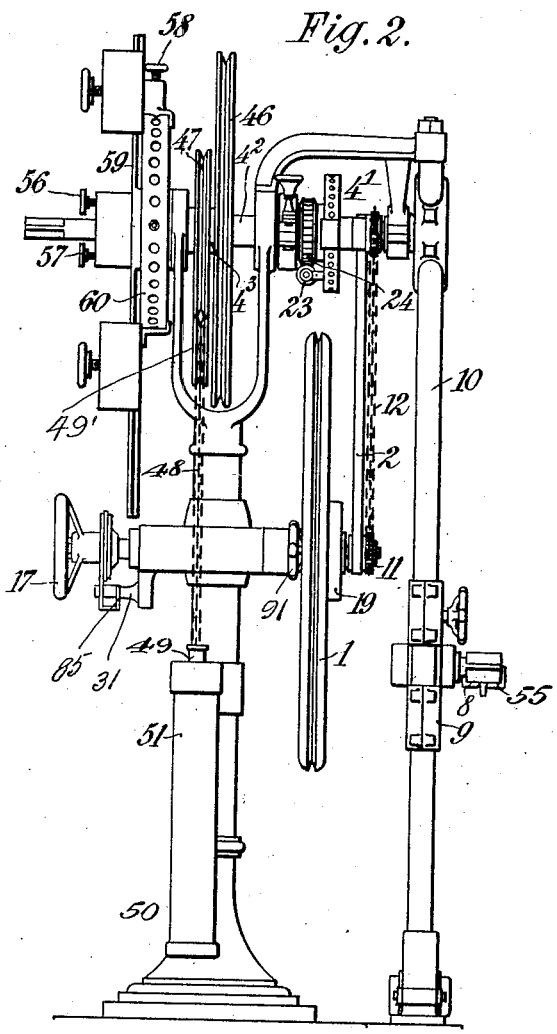

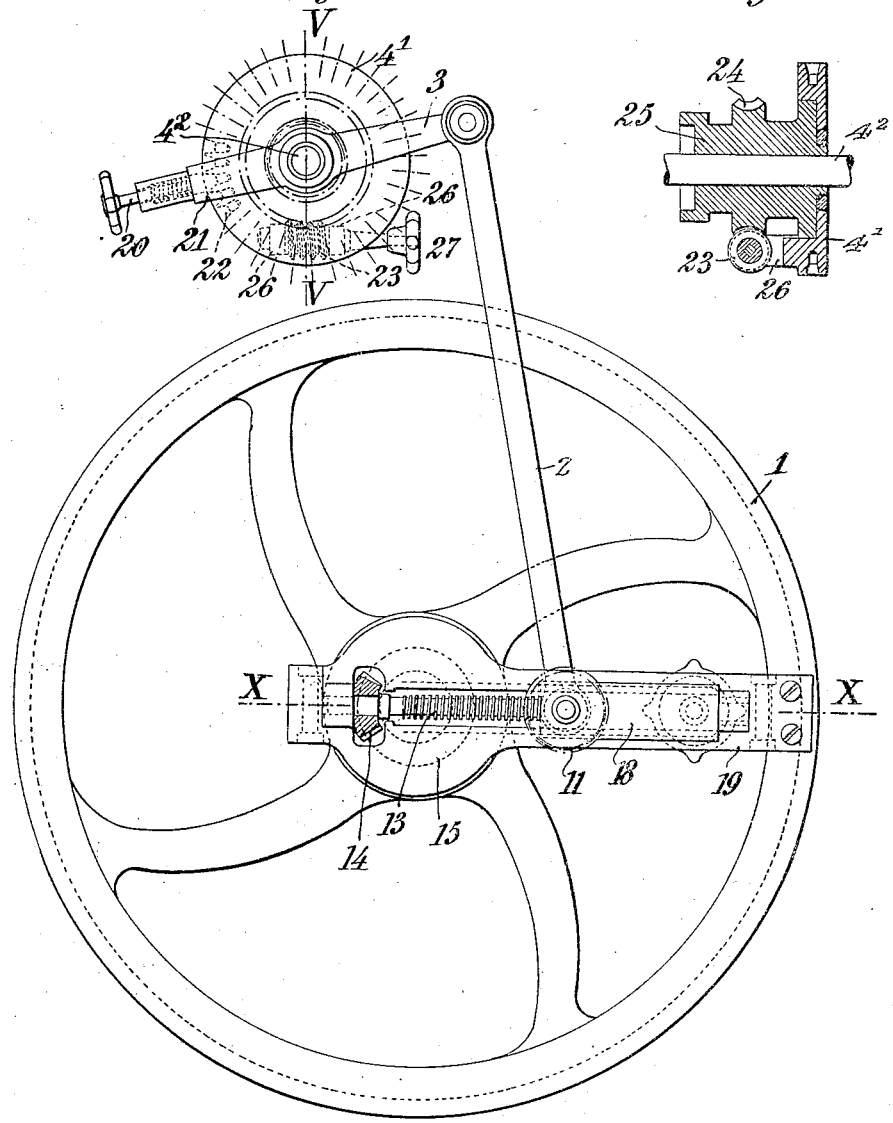

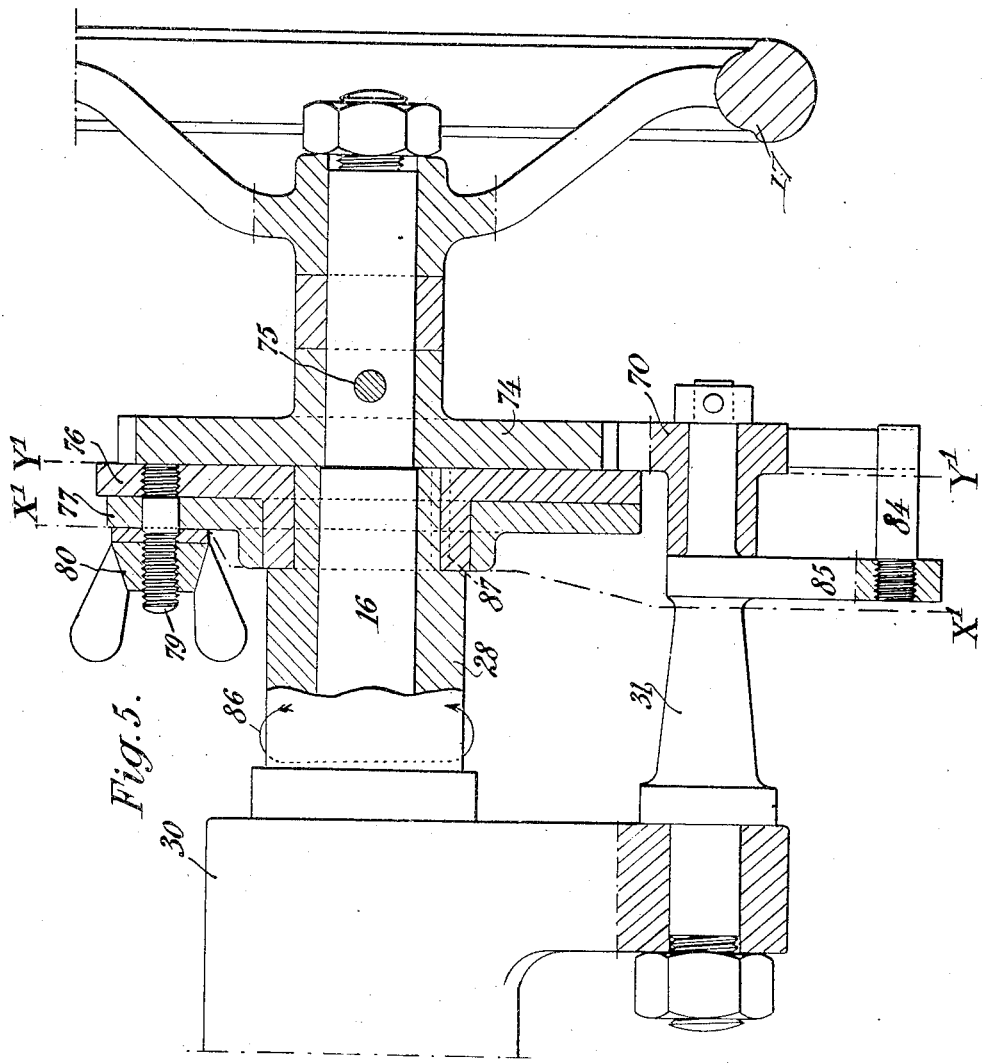

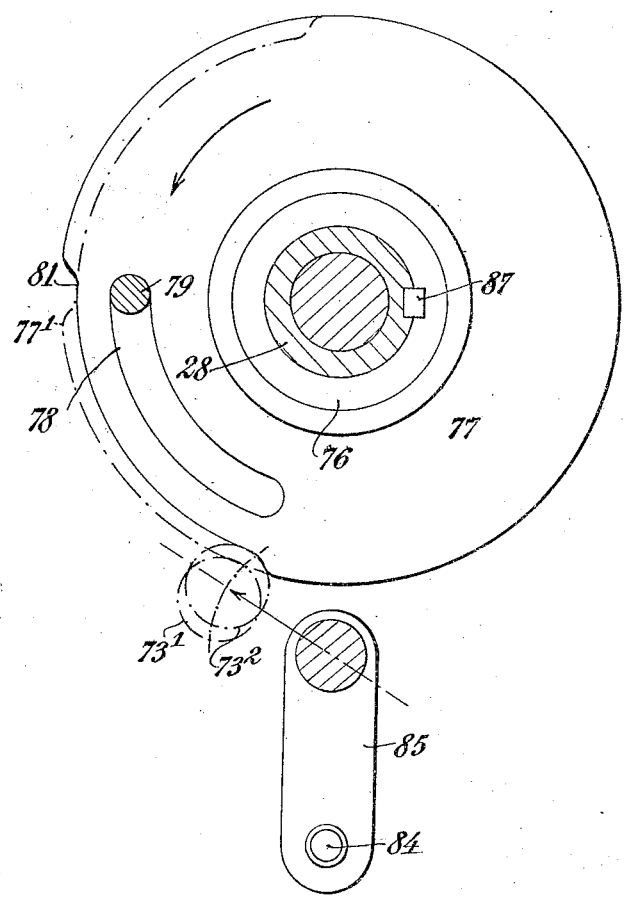

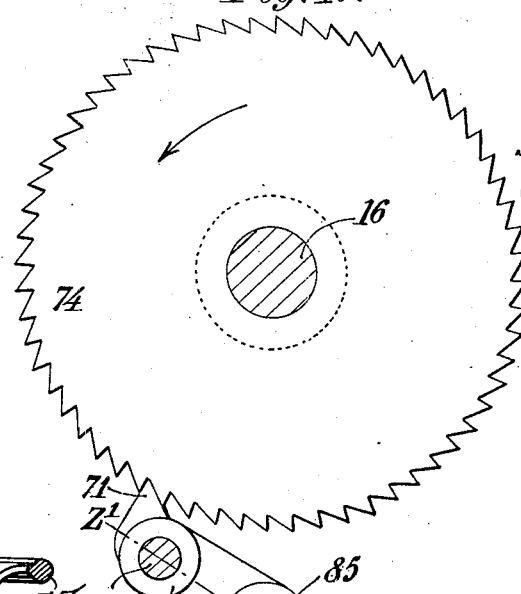
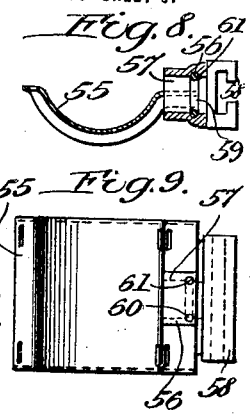
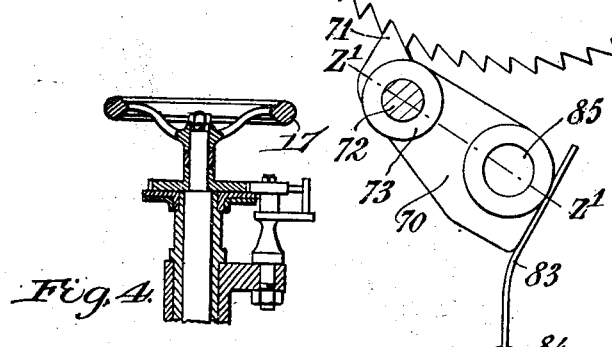
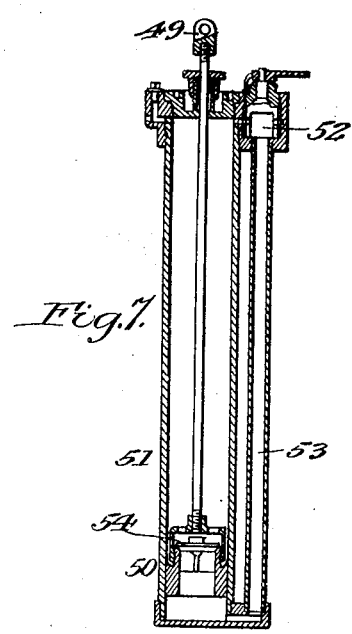
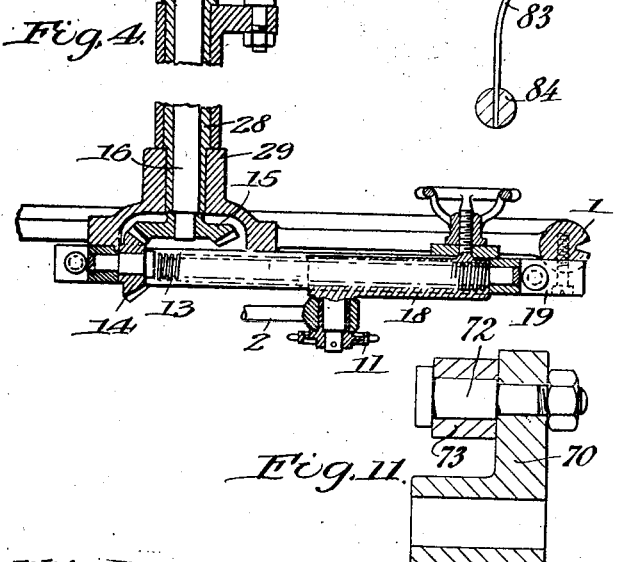

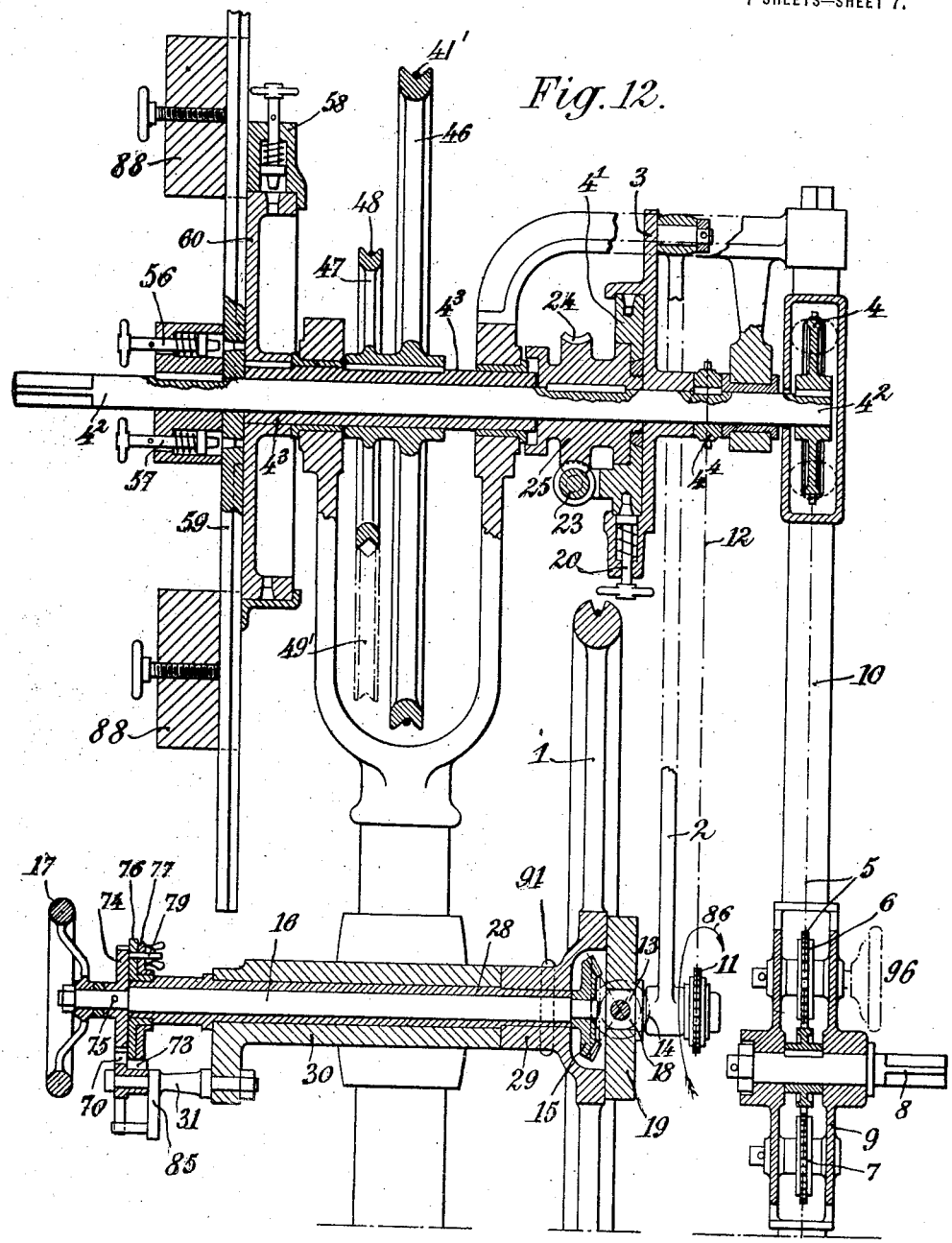

PAUL DE CHAMPTASSIN, OF PARIS, FRANCE.

MECHANOTHERAPEUTIC AND GYMNASTIC APPARATUS.

1,354,804.  Specification of Letters Patent.  Patented Oct. 5, 1920.

Application filed July 18, 1914, Serial No. 851,717. Renewed August 24, 1920. Serial No. 405,764.

*To all whom it may concern:*

Be it known that I, PAUL DE CHAMPTASSIN, a citizen of the Republic of France, residing in Paris, France, have invented certain new and useful Improvements in Mechanotherapeutic and Gymnastic Apparatus, of which the following is a specification.

The present invention relates to improvements in apparatus employed in medical practice for hygienic and sporting purposes under the name of mechano-therapeutic or gymnastic apparatus, the improvements having for their object to cause suitable movements, of desired amplitude and direction, to be imparted to a limb to which the apparatus is applied.

These improvements consist particularly in the combination of mechanical parts which can separately be passive or active elements. Regulating devices are provided for varying, while the machine is in operation or at rest, the region of the oscillating movements of the cradle supporting the limb and also the amplitude of the oscillations; this latter can be also varied progressively and automatically.

The following description with regard to the accompanying drawings, given by way of example, will explain the nature of the improvements.

Figure 1 is a front view of the apparatus and Fig. 2 is a side view.

Figs. 3 and 4 show respectively in front view and in horizontal section on line X—X of Fig. 3, the arrangement for transforming the circular movement of the wheel into oscillating or circular movements also improved regulating devices.

Fig. $3^1$ is a section on line V—V in Fig. 3.

Fig. 5 is a detail section, to larger scale, showing mechanism for automatically varying the angular amplitude of the oscillation of the limb acted upon by the apparatus.

Fig. 6 is a section on X'—X' in Fig. 5.

Fig. 7 shows in section the liquid brake applied to the apparatus.

Figs. 8 and 9 are section and plan views of the trough or cradle for supporting the limb.

Fig. 10 is a section on Y'—Y' in Fig. 5.

Fig. 11 is a section on Z'—Z' in Fig. 10, and Fig. 12 is an enlarged vertical section of the upper part of the mechanism shown in Fig. 2.

The improved apparatus comprises a rotary element 1 herein illustrated as a pulley, driven, for example, by an electric motor and whose circular movement causes, by means of a connecting rod 2 articulated to a crank arm 3, an oscillating movement of the sprocket wheel 4, or more exactly a partial rotary movement alternately in one direction and then the other, which is transmitted by means of chain 5, guide pulleys 6, 7 and the lower sprocket wheel 7' to the shaft 8 on which is mounted the applicator. Some suitable applicator is employed, a cradle for supporting the limb being represented in Figs. 8 and 9, and mounted on the shaft by means of a crank arm.

Shaft 8 turns in a bearing supported by a carrier 9 which can slide along the rods 10 in such a manner that it can be fixed at any desired height.

An auxiliary sprocket wheel 11 is mounted at the end of the connecting rod 2 in a manner capable of being drawn toward the center of the wheel 1 and to be involved in the rotary movement thereof; by means of a chain 12, wheel 11 transmits to sprocket wheel $4^4$ continuous rotary movement and the cradle will turn around instead of being oscillated. This arrangement allows of circular movements being given to the limb. It is to be borne in mind that the wheel 11 should be placed in axial alinement with wheel 1 in order to produce in the apparatus a movement of continuous rotation. The chain is put in place only after such alinement is effected.

Different arrangements may be provided for varying positively the amplitude of the oscillating movements of the applicator while the machine is stationary or in operation and also for automatically making these variations while it is running.

To this end, the end of the connecting rod 2 is pivoted to a wrist pin carrier by a slide 18 in the form of a nut traversed by a screw 13 at the extremity of which screw is keyed the bevel pinion 14.

This pinion engages, as indicated in Fig. 4, with another bevel pinion 15 mounted on the end of shaft 16 whose other extremity carries a hand wheel 17. The assemblage of pinion 14, the threaded rod 13 and nut 18 is supported on a frame 19 bolted to wheel 1, and disposed radially thereof.

It will be seen that during the revolution of the wheel 1, the screw threaded rod 13 and pinion 14 will turn around the axis of the wheel and will in their movement carry around pinion 15 which will turn with shaft 16 without any relative movement in respect to pinion 14; in other words the assemblage will constitute a block turning about the axis of the wheel 1.

If wheel 17 be turned by hand in one direction, pinion 15 will turn, which pinion meshing with pinion 14 will turn the rod 13 and produce movement of nut 18 toward the periphery of wheel 1; if, on the contrary, hand wheel 17 be prevented from turning during the running of the machine, pinion 15 will remain stationary, and by reason of the rotation of wheel 1, pinion 14 will coöperate with pinion 15 as a planet pinion. The result is the screw rod 13 turns in a direction reverse to that previously indicated and causes the return of nut 18 to the center of the wheel. It is evident that the displacement of the nut in either direction can be also produced when the machine is not running by operating the wheel 17.

If it is assumed that the machine rotates in the direction of the hands of a clock, the operator standing behind, turning the wheel 17 in the direction opposite to that of the hands, accelerates the speed of 15. This latter controls at 14 a rotation in the direction of the hands of a clock (putting one's self at the nut), which brings this nut toward the center of 1. On the other hand, if the operator retains the wheel 17 in his hand, the opposite movement is produced, 14 always being dragged by 1, rolls over 15 in the opposite direction, the nut being separated from the center.

The arrangement described allows of the amplitude of the oscillation of the crank arm 3, and consequently of the applicator, being varied positively and in a sensitive manner during the working of the machine. It is to be noted that in Fig. 12, the arm 3, in the upper part has been brought back, by a rotation of 90° forward, into the vertical projection in order to better show it on Fig. 2 and to facilitate the comprehension of the mechanism of the shaft 4², especially of the nut 20 and of the screw 23. On the contrary, at the bottom of the figure, the position of the parts is that it corresponds to the horizontal arm 3. The shaft 2 which will be impossible to place under these conditions has been replaced in the upper part in mixed dotted lines.

For regulating, while the machine is stationary, the region in which the cradle's oscillations, which may be of any amplitude, shall occur, the sprocket wheel 4 is fixed to a notched or slotted plate 4' loosely mounted on a shaft 4². By means of a spring-pressed bolt 20 in alinement with rod 3, the rod 3 can be caused to assume a more or less inclined position by inserting the head 21 of such bolt into one or other of the notches 22. In accordance with the position of crank arm 3, the oscillating movement of this rod caused by the rotation of wheel 1 will occur in different regions and will consequently transmit to the applicator oscillating movements which will be in different regions.

The withdrawal of the bolt 20 and turning around the plate 4¹ allows of varying the oscillatory region of the cradle 55. In fact, when 3 is carried along with the bolt 20, the pieces 4, 5, 8, 55 remain immovable, but 2, 18 and 1 take a different position, and this brings it about that if 2 were, for example, in the middle of its course (as in Fig. 1) and by means of the bolt 20 if it be approaching the dead point, the cradle 55 which is not moved, instead of being found near the middle of the sector described, is ready to change its direction of rotation; the sector being equal, the oscillation is produced in another region. Vice versa, if it is 4, 5, 8, 55 which are displaced and 20, 3, 2, 18 which are held immovable when the notch 20 is changed.

It will, moreover, be seen from the elevation in Fig. 3 and section Fig. 3¹ that the notched wheel 4' carries, by means of a bracket 26, a worm 23 that meshes with teeth 24 cut on a block 25 on which is loosely mounted the wheel 4'. By turning wheel 27 the screw 23 is advanced along the teeth and consequently the wheel 4' is caused to rotate around axis 4² which permits the inclination of rod 3 being changed irrespective of whether the machine is stationary or at work.

The several regulating devices which have been described allow a positive variation, during the working of the machine, or while it is idle, of the amplitude of the oscillating movements which are to be transmitted to the limb, and also the region thereof. The amplitude can be varied antomatically and at the same time smoothly and gradually during the working of the machine.

Some of the mechanical adjustments necessary for carrying out the various movements are as follows:—

(a) Controlled movement of alternative rotation: The nut 18 being placed at any point whatever in its course, but at a distance from the center of 1 less than the length of the arm 3 (Fig. 3), this arm is carried along by an alternative circular movement. The bolt 20 which is situated on the opposite side, is engaged in the idle platform 4¹, which rotates, by means of its screw 23, the worm wheel 24 keyed upon the shaft 4². The rotation of the wheel 4, fast at the end of this shaft, brings about by its movement the movement of the chain 5 and consequently of the squared shaft 8 and of the cradle 55, mounted thereon.

(b) Controlled circular movement: The nut 18 is brought back by means of the flywheel 17 to the center of the flywheel 1, the wheel 11 being exactly at the center; there is placed the chain 12 which connects it to the wheel 4⁴. Disengaging the bolt 20 from the platform 4¹ frees the pieces 2 and 3, the shaft 4² is given a continuous circular movement.

(c) Movement with push: The transmission through the shaft being discontinued, the operator disengages, as before, the tenon of the bolt 20, and engages that of the bolts 56, 57 and 58; the cradle then carries the member by the square 8, drags the chain 5 and the wheel 4, the shaft 4² being placed in motion, as well as the block carrying the nuts 56 and 57; the counterweight control is carried along and by the pusher 58, the platform 60, which gives itself the rotation to the sleeve 4³ and to the wheels 46 and 47, the platform and the wheels being keyed upon this sleeve. This movement is effected by the use of the weight apparatus and the fluid brake.

The wheel 46 displaces the weight by means of the chain 41¹ and the wheel 47 acts in the descent upon the block 51.

The mechanism for the automatic-amplitude variation illustrated, comprises a sleeve 28 loose on shafts 16 and fast with the wheel 1 (turning in the direction of the arrow 86, Fig. 5). On the sleeve is mounted the part 30 which is immovable and carries an arm 31 on the extremity of which is mounted the finger 70 whose end 71 constitutes a pawl and is provided with a pin 72 carrying a roller 73. The pawl is adapted to engage with a ratchet wheel 74 keyed to the end of shaft 16.

The sleeve 28 is keyed at 87 to a disk 76 suitably cut away on its periphery, against which is applied another disk 77 provided with a slot or segmental groove 78 in which is a bolt 79 whose end is screwed into the disk 76; a wing nut 80 working on bolt 79 allows of the two disks being clamped together.

The disk 77 is also cut away on its periphery in the same manner as disk 76, as shown in Fig. 6. On slackening the nut 80, disk 77 can be turned with respect to disk 76, and be made to lie over or register with disk 76 as shown in full lines in Fig. 6 or assume the position indicated at 77' in broken lines or any other intermediate position, whereby the length of the hollow portion 81 formed by the cut away portions of the two disks 76, 77 may be varied. The cam thus produced will be seen to have an adjustable dwell, whereby the pawl which is normally in engagement with the ratchet wheel for holding the same against rotation, is held away from or out of engagement with the ratchet for a predetermined portion of each rotation or cycle of the apparatus.

In these movements the bolts are in the position represented in Fig. 12 and the pawl 70 is engaged on the rack 74. The plate 77 is caused to make a rotation in such a manner that there exists between the two grooves of this plate 77 and of the plate 76 keyed upon the shaft 28, a more or less large space 81 exposing the toothing of the rack 74 to the pawl 71. This being done, the pawl being seen from the end, as in Fig. 6, the sleeve 28 turns in the inverse direction to the hands of a watch carried along by the wheel 1. The shaft 16 is carried along by friction in the casing 28 while the cam 70, 71 is disengaged from the rack 74 by the periphery of the plates 76, 77. But when the roller 73 reaches the hollow 81 (Fig. 6), the pawl comes into engagement with the rack up to the time its roller 73 again disengages it. During this time of engagement, the shaft 16, integral with the rack 74, is stationary, as is also its pinion 15, and consequently the pinion 14, rolling over it in the manner of a satellite, turns the screw 13, which causes the nut 18 to move toward the periphery, increasing thus the amplitude of the oscillations.

Again, as shown in broken lines in Fig. 6, the roller 73 is always in contact with the outer peripheries of the two disks 76, 77 and is retained against these disks by the blade spring 83 applied at the back of finger 70, being mounted in the part 84 fixed to projection 85 on arm 31. The roller 73 may occupy, when shaft 16 and the sleeve 28 turn in the direction of the arrow 86, two positions; one 73' in which the pawl 71, fixed to the axis 72 of the roller, is out of range of the teeth of the ratchet wheel 74 and the other 73² in which, on the contrary, the pawl 71 renders the ratchet wheel 74 immovable turning in the direction of the arrow 86. This position 73² is occupied by the roller 73 as soon as the hollow 81 formed by peripheries of the disks 76, 77 passes below the said roller.

As the arm 31 is fixed, it follows that, at each turn of the sleeve 28, the pawl 71 will, during a certain period (by reason of the oscillating movement of roller 73 and consequently finger 70) render the ratchet wheel 74, and consequently shaft 16, immovable, and this, as will be seen from Fig. 4, causes bevel wheel 15 at the end of the shaft 16 to be stationary so that pinion 14 rolls around like a planet and in doing so will turn the screw rod 13 and shift the nut 18 toward the periphery of the wheel 1, thereby modifying the amplitude of the oscillation of the device which carries the limb.

At each turn of the sleeve 28 the same phenomena are reproduced, and an automatic variation of the amplitude of the oscillating movement of this device is obtained, the intensity of the movement being thus increased throughout the course of the exercise and until the nut 18 reaches the outward limit of its movement. Of course, the relative timing of the parts and the effective length of travel of the nut 18 on the rod 13 will be proportioned to assure proper action during the treatment for which the machine is built.

According to the period in which ratchet wheel 74 will be stationary, that is to say according to the length of the hollow 81, which is regulated as described above by the displacement of disk 77 with respect to disk 76, so there will be obtained at each turn a movement, more or less great, of the nut 18 (Fig. 4) and consequently at each turn a variation, more or less great, of the amplitude of the oscillation of the cradle or other device which supports the limb.

To maintain the amplitude constant, pawl 71 may be disengaged from the teeth of the wheel 74 by turning finger 70 around the axis 85 on which it is mounted.

As will be seen in Figs. 8 and 9, the limb-supporting cradle 55 is shown carried by a support 56, pivotally mounted on a spindle 57 rigid with a part 58 adapted to slide in a manner to permit the cradle being shifted laterally upon shaft 8 of the apparatus. Around the spindle 57 is formed a circular groove 59 for the reception of two pins 60, 61 which secure the support 56 of the cradle and the slide 58 together while allowing the said support to turn around the spindle 57 so as to assume the same inclination as the limb.

The improvements according to this invention also comprise the application to the apparatus of a system consisting of a heavy weight and adapted to cause the injured limb to make a determined effort by raising this heavy weight. Moreover, a fluid brake is provided in order that the weight may return smoothly and without shock to its lower position without the limb being subjected to any counterblows or required to make any effort as the weight descends.

For this purpose, as seen in Fig. 1, a weight 41 is adapted to slide along a movable rod 42 that can be fixed in position on a sector 43 so that the rod may assume a vertical horizontal or any intermediate position. To this weight 41 is fixed a cord or chain 41' which passes over guide pulleys 44, 45 and is fixed to the hand wheel 46, keyed to a sleeve 4³ turning loosely on shaft 4².

On sleeve 4³ is also fixed a pulley 47 connected with wheel 46 and to which is attached the end of a second cable 48 which passes over a guide pulley 49' and whose other end is fixed to rod 49 of the brake portion 50. For details of this see Fig. 7.

If it be desired to impart to the limb an oscillating movement in the reverse direction, while raising the weight 41 it will be sufficient to change the direction of the winding of the cables 41' and 48 on the pulleys 46 and 47, the cable 41' will be guided by the guide pulley 48'.

The fluid brake, which is associated with the heavy weight device and is adapted to brake the descent of the latter, comprises a cylinder 51 whose lower and upper ends are connected by a duct 53 which can be closed by means of a hand controlled valve 52. On the piston is arranged in customary manner a valve 54. It will be seen that when the weight is raised by the patient, the piston descends in cylinder 51 and the fluid passes freely through valve 54. On the other hand when the weight descends again it causes the piston to rise whereupon the valve 54 closes, causing the fluid, which may be glycerin or other suitable substance, to pass through the controllable valves of the duct 52, setting up a braking action. Of course any other brake may be used in place of the glycerin or fluid brake.

Having thus described the nature of the said invention and the best means I know of carrying the same into practical effect, I claim:—

1. A mechano-therapeutic and gymnastic apparatus, comprising in combination a rotary element, a support for the limb of the patient, means for transforming the rotary movement of the said element into an oscillating movement of the limb support, and means for automatically varying the amplitude of the oscillating movements of the limb support during the working of the apparatus.

2. A mechano-therapeutic and gymnastic apparatus comprising a rotary element, an oscillatory support for the limb of the patient, a frame radially disposed on said rotary element, an oscillatory crank arm, a slide on the frame having a screw-threaded opening and provided with a wrist pin, said oscillatory arm being connected to the limb support, a connecting rod carried by the wrist pin and articulated to said oscillatory arm, a screw rod mounted on the rotary element and traversing said slide, and automatic means for rotating the said screw rod for positively varying the amplitude of the oscillating movements of the limb support during the running of the apparatus.

3. A mechano-therapeutic and gymnastic apparatus comprising a rotary element, an oscillatory support for the limb of the patient, a frame radially disposed on said rotary element, an oscillatory crank arm, a slide on the frame having a screw-threaded opening and provided with a wrist pin, said oscillatory arm being connected to the limb support, a connecting rod carried by the wrist pin and articulated to said oscillatory arm, a screw rod mounted on the rotary element and traversing said slide, a bevel pinion on the end of the screw rod, a second bevel pinion coöperating with the first said bevel pinion, a shaft carrying the said second bevel pinion for the purpose of producing, when the said shaft is held stationary, the rotation of the first pinion and the adjustment of the slide on the frame for positively varying the amplitude of the oscillating movements of the limb support during the running of the apparatus, and means for intermittently holding stationary and releasing the said shaft.

4. A mechano-therapeutic and gymnastic apparatus comprising a rotary element, an oscillatory support for the limb of the patient, a frame radially disposed on said rotary element, an oscillatory crank arm, a slide on the frame having a screw-threaded opening and provided with a wrist pin, said oscillatory arm being connected to the limb support, a connecting rod carried by the wrist pin and articulated to said oscillatory arm, a screw rod mounted on the rotary element and traversing said slide, a bevel pinion on the end of the screw rod, a second bevel pinion coöperating with the first said bevel pinion, a shaft carrying the said second bevel pinion for the purpose of producing, when the said shaft is held stationary, the rotation of the first pinion and the adjustment of the slide on the frame for positively varying the amplitude of the oscillating movements of the limb support during the running of the apparatus, a ratchet wheel fast with the said shaft, a pawl normally in engagement with the said ratchet wheel for holding the same against rotation, and a cam fast with the screw rod and adapted to hold the pawl out of engagement with the ratchet.

5. A mechano-therapeutic and gymnastic apparatus comprising a rotary element, an oscillatory support for the limb of the patient, a frame radially disposed on said rotary element, an oscillatory crank arm, a slide on the frame having a screw-threaded opening and provided with a wrist pin, said oscillatory arm being connected to the limb support, a connecting rod carried by the wrist pin and articulated to said oscillatory arm, a screw rod mounted on the rotary element and traversing said slide, a bevel pinion on the end of the screw rod, a second bevel pinion coöperating with the first said bevel pinion, a shaft carrying the said second bevel pinion for the purpose of producing, when the said shaft is held stationary, the rotation of the first pinion and the adjustment of the slide on the frame for positively varying the amplitude of the oscillating movements of the limb support during the running of the apparatus, a ratchet wheel fast with the said shaft, a pawl normally in engagement with the said ratchet wheel for holding the same against rotation, and a cam of adjustable dwell fast with the screw rod and adapted to hold the pawl out of engagement with the ratchet for a predetermined portion of each rotation.

In witness whereof, I have hereunto signed my name in the presence of two subscribing witnesses.

PAUL DE CHAMPTASSIN.

Witnesses:
TRACY LAY,
GABRIEL BELLIARD.